(12) United States Patent
Yoshioka et al.

(10) Patent No.: US 10,793,136 B2
(45) Date of Patent: Oct. 6, 2020

(54) VEHICLE BEHAVIOR CONTROL DEVICE

(71) Applicant: MAZDA MOTOR CORPORATION, Hiroshima (JP)

(72) Inventors: Toru Yoshioka, Hiroshima (JP); Daisuke Umetsu, Hiroshima (JP); Osamu Sunahara, Hiroshima (JP); Yasunori Takahara, Hiroshima (JP); Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 147 days.

(21) Appl. No.: 16/084,982

(22) PCT Filed: Mar. 30, 2017

(86) PCT No.: PCT/JP2017/013459
§ 371 (c)(1),
(2) Date: Sep. 14, 2018

(87) PCT Pub. No.: WO2017/183416
PCT Pub. Date: Oct. 26, 2017

(65) Prior Publication Data
US 2019/0084552 A1 Mar. 21, 2019

(30) Foreign Application Priority Data
Apr. 22, 2016 (JP) .................. 2016-086536

(51) Int. Cl.
*B60W 10/06* (2006.01)
*B60W 10/04* (2006.01)
(Continued)

(52) U.S. Cl.
CPC ............ *B60W 10/06* (2013.01); *B60W 10/04* (2013.01); *B60W 10/20* (2013.01); *B60W 30/02* (2013.01); *B60W 40/101* (2013.01); *B62D 6/00* (2013.01)

(58) Field of Classification Search
USPC .......................................... 701/70
See application file for complete search history.

(56) References Cited

U.S. PATENT DOCUMENTS

| | | | |
|---|---|---|---|
| 6,017,101 A | * | 1/2000 | Matsuda .................. B60T 7/12 180/169 |
| 2009/0030574 A1 | | 1/2009 | Yamakado et al. |

(Continued)

FOREIGN PATENT DOCUMENTS

| | | |
|---|---|---|
| JP | 2005-145143 A | 6/2005 |
| JP | 2007-270704 A | 10/2007 |

(Continued)

OTHER PUBLICATIONS

Written Opinion issued in PCT/JP2017/013459; dated May 23, 2017.

(Continued)

*Primary Examiner* — Marthe Y Marc-Coleman
(74) *Attorney, Agent, or Firm* — Studebaker & Brackett PC

(57) ABSTRACT

There is provided a vehicle behavior control device capable of improving responsivity of a vehicle behavior and a linear feeling with respect to a steering wheel operation without causing a driver to experience a strong feeling of intervention of the control and, at the same time, capable of controlling behavior of a vehicle in such a manner as to also improve stability of the vehicle attitude and riding comfort. In a vehicle behavior control device applied to a vehicle having steerable front road wheels, the vehicle behavior control device includes a PCM which acquires a steering (Continued)

speed of the vehicle, and generates a deceleration jerk which is a rearward jerk in a longitudinal direction of the vehicle when the steering speed becomes equal to or greater than a given threshold $T_{S1}$ which is greater than zero.

2 Claims, 12 Drawing Sheets

(51) Int. Cl.
    *B62D 6/00*         (2006.01)
    *B60W 10/20*     (2006.01)
    *B60W 30/02*     (2012.01)
    *B60W 40/101*   (2012.01)

(56) References Cited

U.S. PATENT DOCUMENTS

2014/0316653 A1* 10/2014 Kikuchi ............. B60T 8/17555
                                                                        701/38

2014/0358370 A1* 12/2014 Kikuchi ............. B60G 17/0165
                                                                           701/37
2017/0087986 A1     3/2017 Ujihara et al.

FOREIGN PATENT DOCUMENTS

| | | |
|---|---|---|
| JP | 2010-119204 A | 5/2010 |
| JP | 2013-063733 A | 4/2013 |
| JP | 5193885 B2 | 5/2013 |
| JP | 2017-067000 A | 4/2017 |

OTHER PUBLICATIONS

Extended European Search Report issued by the European Patent Office dated Apr. 23, 2019, which corresponds to EP17785758.8-1012 and is related to U.S. Appl. No. 16/084,982.

International Search Report issued in PCT/JP2017/013459; dated May 23, 2017.

An Office Action; "Notification of Reasons for Rejection," mailed by the Japanese Patent Office dated Feb. 13, 2017, which corresponds to Japanese Patent Application No. 2016-086536.

* cited by examiner

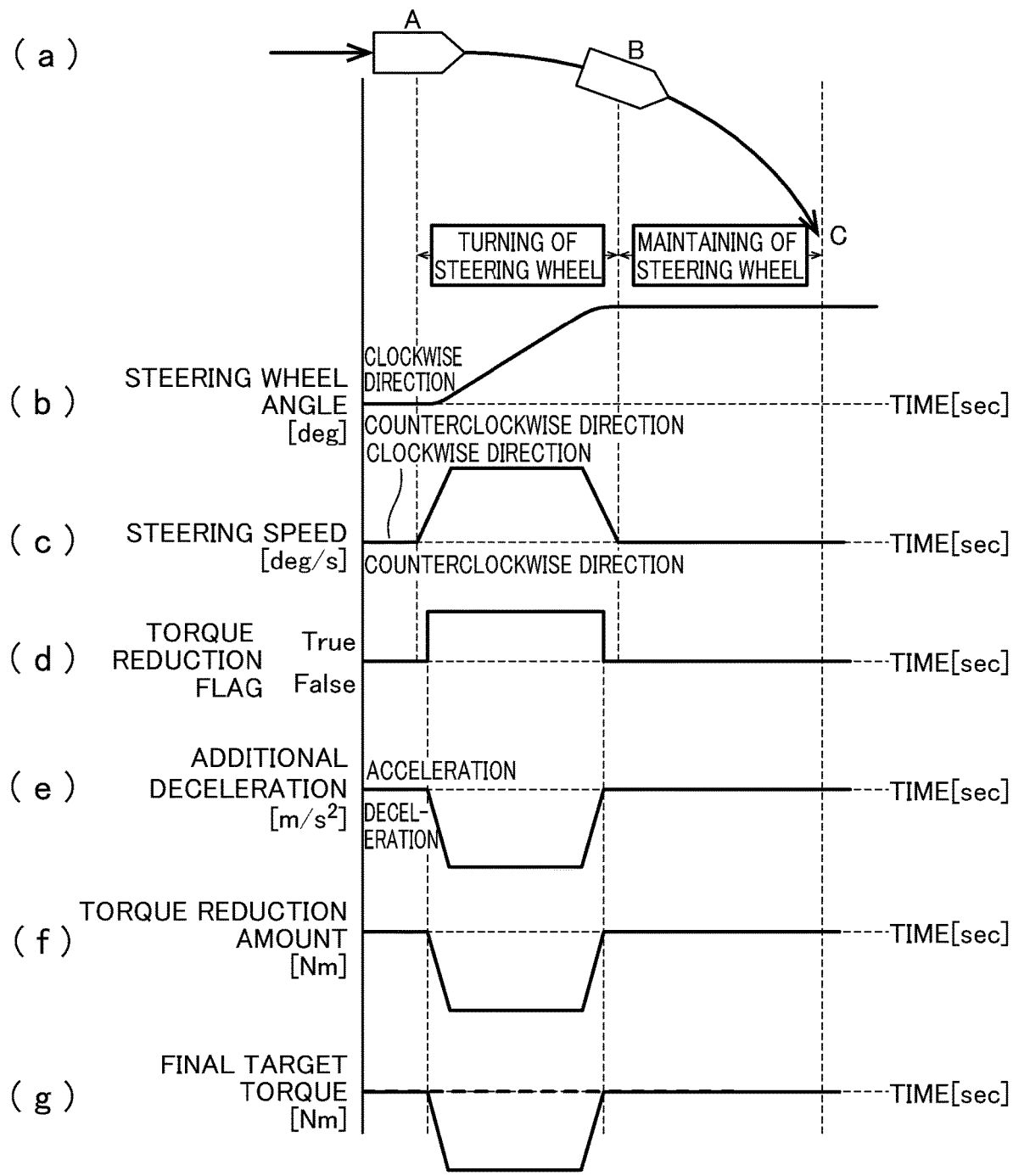

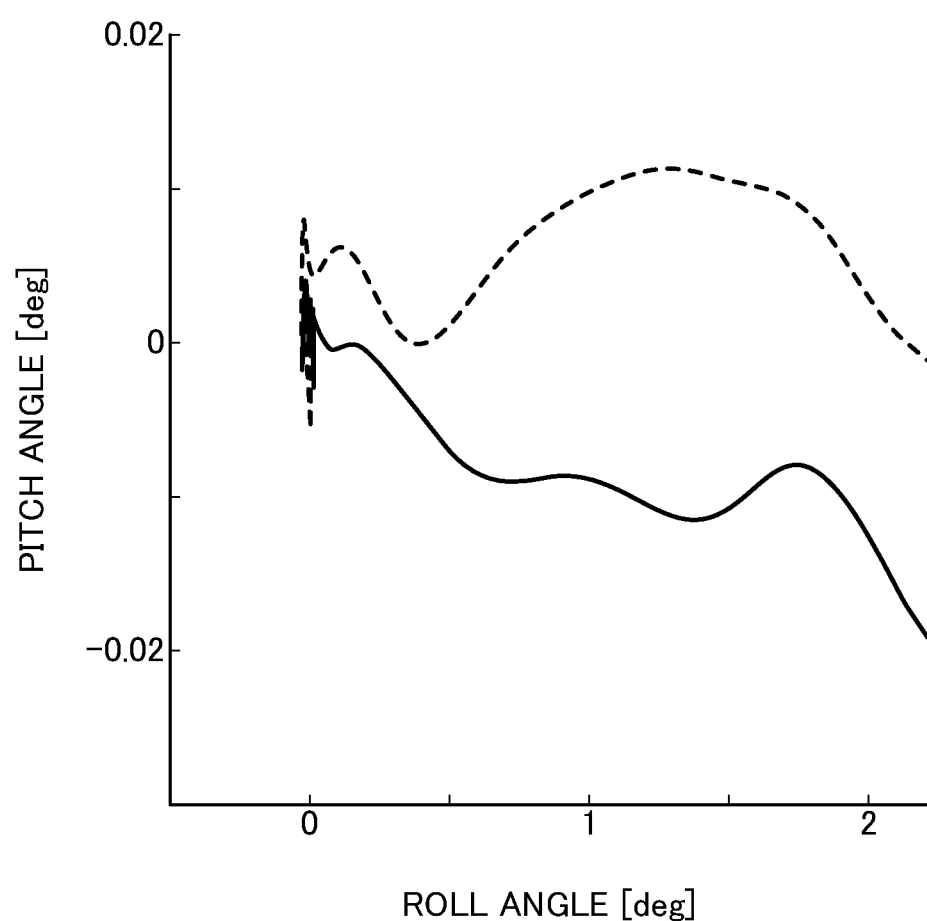

VEHICLE BEHAVIOR CONTROL DEVICE

TECHNICAL FIELD

The present invention relates to a vehicle behavior control device, and more particularly to a vehicle behavior control device for controlling behavior of a vehicle having steerable front road wheels.

BACKGROUND ART

Heretofore, there has been known a control system capable of, in a situation where behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to automatically perform an acceleration or a deceleration associated with a steering wheel operation which is started from a usual driving region, to thereby reduce skid in a marginal driving region, differently from the above control for improving safety in a traveling condition causing the vehicle behavior to become unstable (see Patent Document 1, for example).

CITATION LIST

[Patent Document]
Patent Document 1: Japanese Patent No. 5193885

SUMMARY OF INVENTION

Technical Problem

However, when the acceleration or the deceleration is automatically controlled in response to an instruction from a control device as in the case of the above-mentioned technique described in Patent Literature 1, the acceleration or the deceleration which does not necessarily agree with the intention of a driver is performed and hence, the driver may experience a strong feeling of intervention of the control. On the other hand, when control gain is reduced so as to suppress a feeling of intervention of the control, advantageous effects which can be acquired due to control of the acceleration or the deceleration are also reduced.

Further, the conventional technique described in Patent Literature 1 focuses on that a driver performing only a steering operation for turning is allowed to realize a vehicle motion similar to the vehicle motion of an expert driver. However, the conventional technique does not necessarily acquire improvement in responsivity of vehicle behavior and a linear feeling with respect to a standard steering wheel operation.

The present invention has been made to solve the above conventional problem, and an object thereof is to provide a vehicle behavior control device capable of improving responsivity of vehicle behavior and a linear feeling with respect to a steering wheel operation without causing a driver to experience a strong feeling of intervention of the control and, at the same time, capable of controlling behavior of a vehicle in such a manner as to also improve stability of the vehicle attitude and riding comfort.

Solution to Technical Problem

In order to achieve the above object, a vehicle behavior control device applied to a vehicle having a steerable front road wheel, the vehicle behavior control device including: a steering speed acquiring part configured to acquire a steering speed of the vehicle; and a deceleration jerk generating part configured to generate a deceleration jerk which is a rearward jerk in a longitudinal direction of the vehicle, when the steering speed becomes equal to or greater than a given threshold which is greater than zero.

In the present invention having such a configuration, the deceleration jerk generating part generates, when the steering speed becomes equal to or greater than the threshold, a rearward deceleration jerk in the longitudinal direction of the vehicle and hence, after a driver starts a steering wheel operation, at a timing earlier than a deceleration jerk caused only by a drag force, a deceleration jerk can be generated substantially simultaneously with the generation of a lateral jerk. With such a configuration, at an initial stage of turning of the vehicle, the deceleration jerk is immediately generated according to the steering wheel operation so as to increase a deceleration thus increasing a vertical load on the front road wheel. Accordingly, it is possible to control behavior of the vehicle with good responsivity and a linear feeling with respect to the steering wheel operation performed by the driver and, at the same time, to control behavior of the vehicle such that the deceleration also rises following a rise of a lateral acceleration at the initial stage of turning so that the lateral acceleration and the deceleration vary while maintaining a linear relationship. Therefore, behavior of the vehicle can be controlled in such a manner as to also improve stability of the vehicle attitude and riding comfort.

In the present invention, it is preferable that the deceleration jerk generating part is configure to start to reduce a driving force of the vehicle when the steering speed becomes equal to or greater than the threshold, so as to generate the deceleration jerk.

In the present invention having such a configuration, after a driver starts a steering wheel operation, a deceleration jerk can be generated with high responsivity. Accordingly, it is possible to control behavior of the vehicle with better responsivity with respect to the steering wheel operation performed by the driver and, at the same time, to control behavior of the vehicle in such a manner as to also further improve stability of the vehicle attitude and riding comfort.

In the present invention, it is preferable that, when the steering speed becomes equal to or greater than the threshold, the deceleration jerk generating part is configured to generate the deceleration jerk such that a peak of the deceleration jerk occurs before a peak of a jerk in a width direction of the vehicle.

In the present invention having such a configuration, at the initial stage of turning of the vehicle, the deceleration jerk is immediately generated according to the steering wheel operation so as to increase a deceleration thus increasing a vertical load on the front road wheels. Accordingly, it is possible to control behavior of the vehicle with better responsivity with respect to the steering wheel operation performed by a driver and, at the same time, to control behavior of the vehicle in such a manner as to also improve stability of the vehicle attitude and riding comfort.

Effect of Invention

According to the vehicle behavior control device according to the present invention, it is possible to improve responsivity of vehicle behavior and a linear feeling with respect to a steering wheel operation without causing a driver to experience a strong feeling of intervention of the control and, at the same time, to control behavior of a vehicle in such a manner as to also improve stability of the vehicle attitude and riding comfort.

BRIEF DESCRIPTION OF DRAWINGS

FIG. 6 is a time chart depicting a temporal change of each parameter pertaining to engine control during turning of a vehicle equipped with the vehicle behavior control device according to the embodiment of the present invention, wherein: the chart (a) is a plan view schematically depicting the vehicle which is turning in a clockwise direction; the chart (b) is a diagram depicting a change in steering wheel angle of the vehicle which is turning in the clockwise direction; the chart (c) is a diagram depicting a change in steering speed of the vehicle which is turning in the clockwise direction; the chart (d) is a diagram depicting a value of a torque reduction flag set based on the steering speed; the chart (e) is a diagram depicting a change in additional deceleration decided based on the steering speed and the torque reduction flag; the chart (f) is a diagram depicting a change in torque reduction amount decided based on the additional deceleration; and the chart (g) is a diagram depicting a change in final target torque decided based on a basic target torque and the torque reduction amount.

FIG. 10 is a diagram depicting the manner of occurrence of rolling and pitching when each of the vehicle equipped with the vehicle behavior control device according to the embodiment of the present invention and the vehicle which is not equipped with the vehicle behavior control device is caused to perform turning traveling.

DESCRIPTION OF EMBODIMENTS

With reference to the accompanying drawings, a vehicle behavior control device according to an embodiment of the present invention will now be described.

Figure 1:
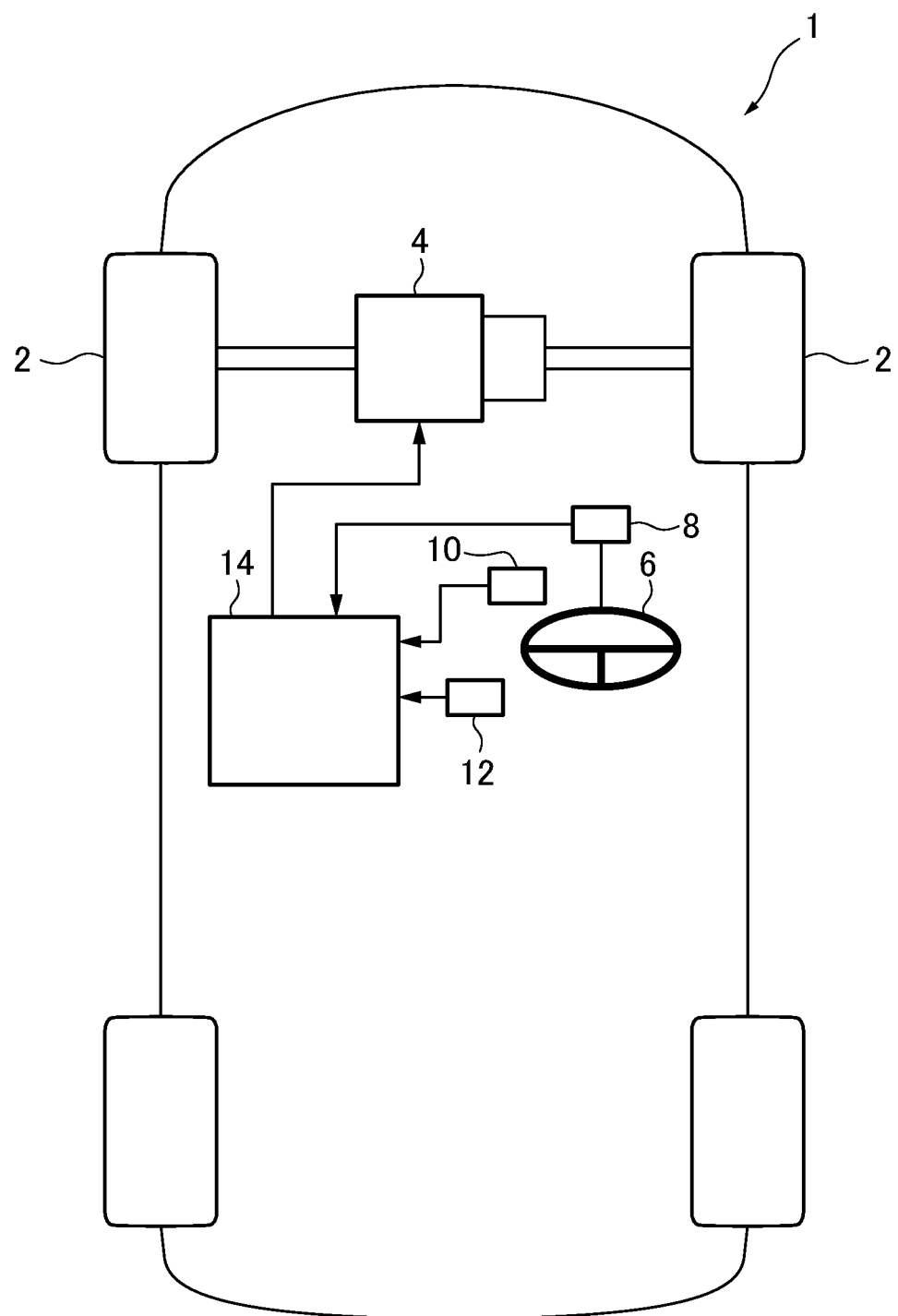
FIG. 1 is a block diagram depicting an entire configuration of a vehicle equipped with a vehicle behavior control device according to an embodiment of the present invention.

First of all, with reference to FIG. 1, a vehicle equipped with the vehicle behavior control device according to the embodiment of the present invention will be described. FIG. 1 is a block diagram depicting an entire configuration of the vehicle equipped with the vehicle behavior control device according to the embodiment of the present invention.

In FIG. 1, the reference sign 1 denotes the vehicle equipped with the vehicle behavior control device according to this embodiment. A vehicle body of the vehicle 1 has a front portion on which an engine 4 for driving drive road wheels (in the example depicted in FIG. 1, right and left front road wheels 2) is mounted. The engine 4 is an internal combustion engine such as a gasoline engine or a diesel engine.

The vehicle 1 has: a steering wheel angle sensor 8 for detecting a rotational angle of a steering wheel 6; an accelerator position sensor 10 for detecting an amount of depression of an accelerator pedal (accelerator position); and a vehicle speed sensor 12 for detecting a vehicle speed. Each of the above sensors is operable to output a detection value to a PCM (Power-train Control Module) 14.

Figure 2:
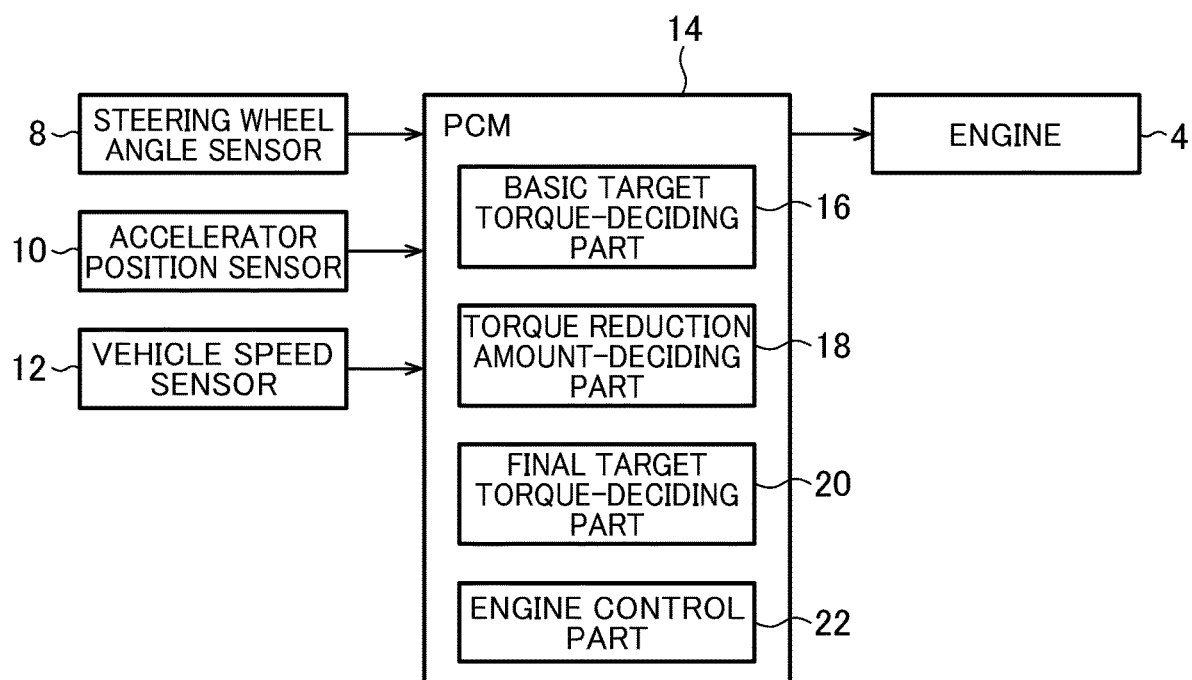
FIG. 2 is a block diagram depicting an electrical configuration of the vehicle behavior control device according to the embodiment of the present invention.

Subsequently, with reference to FIG. 2, an electrical configuration of the vehicle behavior control device according to the embodiment of the present invention will be described. FIG. 2 is a block diagram depicting the electrical configuration of the vehicle behavior control device according to the embodiment of the present invention.

The PCM 14 according to the embodiment of the present invention is configured to, based on detection signals output from various sensors for detecting an operating state of the engine 4 besides detection signals output from the above sensors 8 to 12, output control signals to perform controls with respect to respective constitutional elements (e.g., a throttle valve, a turbocharger, a variable valve mechanism, an ignition unit, a fuel injection valve, and an EGR unit) of the engine 4.

The PCM 14 includes: a basic target torque-deciding part 16 for deciding a basic target torque based on a driving state of the vehicle 1 including an accelerator pedal operation; a torque reduction amount-deciding part 18 for deciding a torque reduction amount for adding a deceleration to the vehicle 1 based on a quantity relating to a jerk in the vehicle width direction of the vehicle 1 (lateral jerk-related quantity); a final target torque-deciding part 20 for deciding a final target torque based on the basic target torque and the torque reduction amount; and an engine control part 22 for controlling the engine 4 to cause the engine 4 to output the final target torque. This embodiment will be described based on an example where the torque reduction amount-deciding part 18 uses a steering speed of the vehicle 1 as the lateral jerk-related quantity.

Respective components of the PCM 14 are functionally realized by a computer which includes: a CPU; various programs (including a basic control program such as an OS, and an application program capable of being activated on the OS to realize a specific function) to be interpreted and executed on the CPU; and an internal memory such as a ROM or a RAM for storing the programs and various data.

A PCM 14 is equivalent to "vehicle behavior control device" according to the present invention, and functions as "steering speed acquiring part" and "deceleration jerk generating part", although details thereof will be described later.

Subsequently, with reference to FIGS. 3 to 5, processing to be performed by the vehicle behavior control device will be described.

Figure 3:
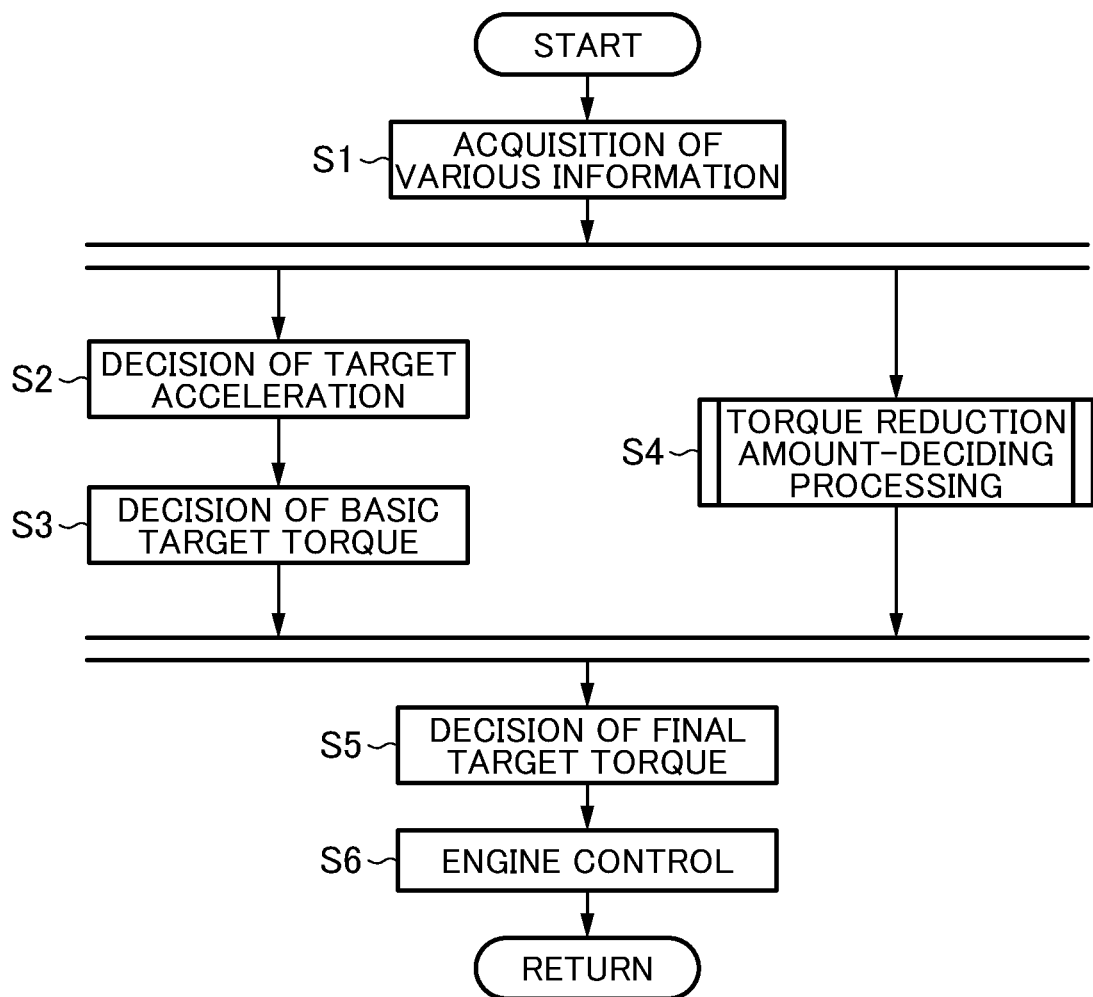
FIG. 3 is a flowchart of engine control processing to be performed by the vehicle behavior control device according to the embodiment of the present invention, so as to control an engine.

FIG. 3 is a flowchart of engine control processing to be performed by the vehicle behavior control device according to the embodiment of the present invention, so as to control the engine 4. FIG. 4 is a flowchart of torque reduction amount-deciding processing to be performed by the vehicle behavior control device according to the embodiment of the present invention, so as to decide the torque reduction amount. FIG. 5 is a map depicting a relationship between the steering speed, and a target additional deceleration to be decided by the vehicle behavior control device according to the embodiment of the present invention.

The engine control processing in FIG. 3 is activated when an ignition switch of the vehicle 1 is turned on to apply power to the vehicle behavior control device, and repeatedly executed.

As depicted in FIG. 3, upon start of the engine control processing, in step S1, the PCM 14 operates to acquire various information about the driving state of the vehicle 1. Specifically, the PCM 14 operates to acquire, as information about the driving state, detection signals output from the aforementioned various sensors, including the steering wheel angle detected by the steering wheel angle sensor 8, the accelerator position detected by the accelerator position sensor 10, the vehicle speed detected by the vehicle speed sensor 12, and a gear stage currently set in a transmission of the vehicle 1.

Subsequently, in step S2, the basic target torque-deciding part 16 of the PCM 14 operates to set a target acceleration based on the driving state of the vehicle 1 including the accelerator pedal operation, acquired in step S1. Specifically, the basic target torque-deciding part 16 operates to select, from acceleration characteristic maps in which various vehicle speeds and various gear stages are defined (the maps are preliminarily created and stored in a memory or the like), an acceleration characteristic map which corresponds to a current vehicle speed and a current gear stage, and decide a target acceleration corresponding to a current accelerator position, with reference to the selected acceleration characteristic map.

Subsequently, in step S3, the basic target torque-deciding part 16 operates to decide the basic target torque of the engine 4 for realizing the target acceleration decided in step S2. In this embodiment, the basic target torque-deciding part 16 operates to decide the basic target torque within a torque range outputtable by the engine 4, based on current vehicle speed, gear stage, road grade, road surface μ, etc.

In parallel to the processing in steps S2 and S3, in step S4, the torque reduction amount-deciding part 18 operates to perform the torque reduction amount-deciding processing of deciding the torque reduction amount for adding a deceleration to the vehicle 1, based on a steering wheel operation. This torque reduction amount-deciding processing will be described with reference to FIG. 4.

Figure 4:
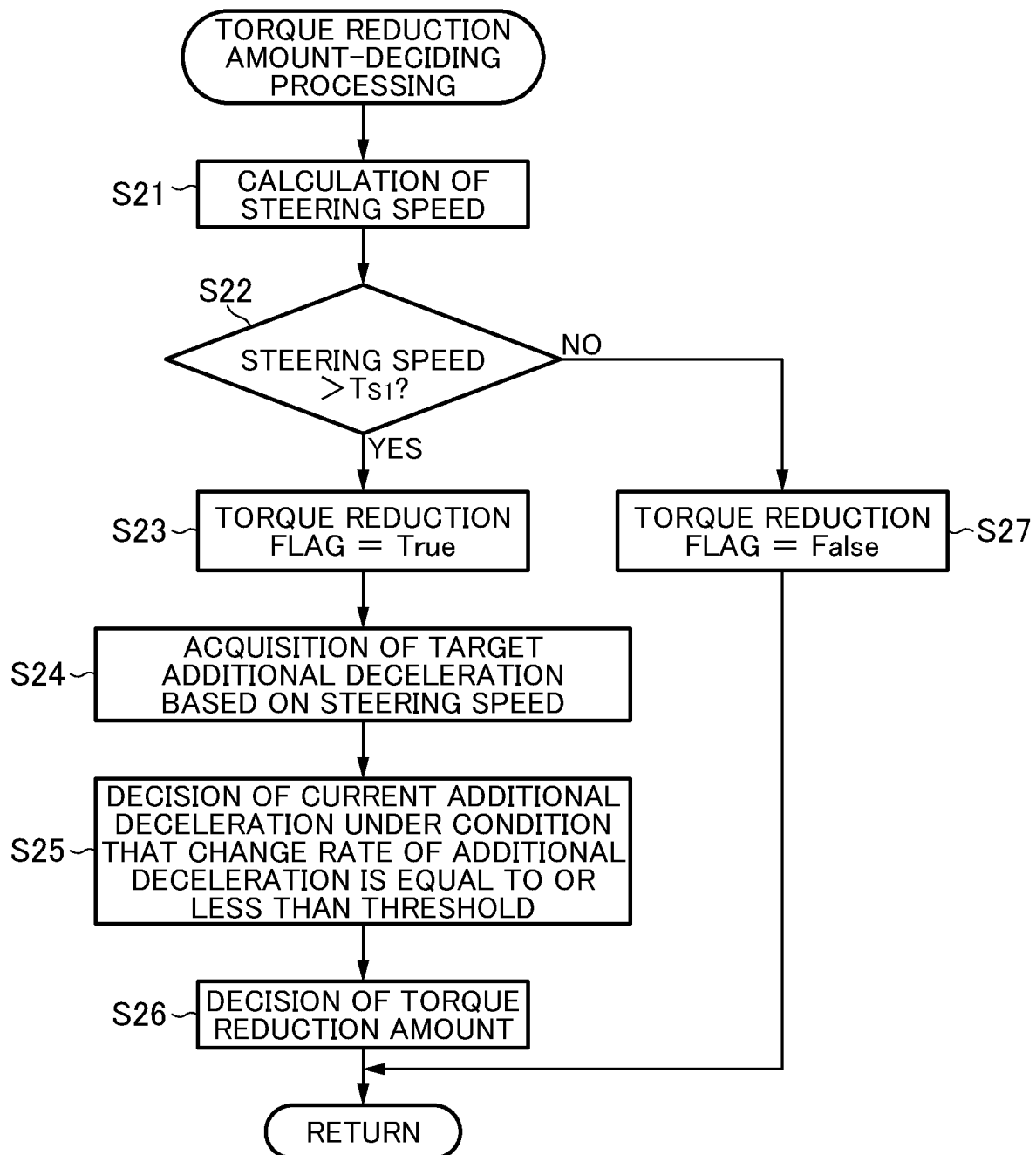
FIG. 4 is a flowchart of torque reduction amount-deciding processing to be performed by the vehicle behavior control device according to the embodiment of the present invention, so as to decide a torque reduction amount.

As depicted in FIG. 4, upon start of the torque reduction amount-deciding processing, in step S21, the torque reduction amount-deciding part 18 operates to calculate the steering speed based on the steering wheel angle acquired in step S1.

Subsequently, in step S22, the torque reduction amount-deciding part 18 operates to determine whether or not the steering speed is greater than a given threshold $T_{S1}$.

As a result, when the steering speed is greater than the threshold $T_{S1}$, the processing advances to step S23. In step S23, the torque reduction amount-deciding part 18 operates to set the torque reduction flag, indicative of whether or not a condition for allowing reduction of an output torque of the engine 4 so as to add a deceleration to the vehicle 1 is satisfied, to True (true value) indicative of a state in which the condition for allowing the torque reduction is satisfied.

Subsequently, in step S24, the torque reduction amount-deciding part 18 operates to acquire the target additional deceleration based on the steering speed. This target additional deceleration is a deceleration to be added to the vehicle 1 according to the steering wheel operation in order to accurately realize vehicle behavior which is intended by a driver.

Figure 5:
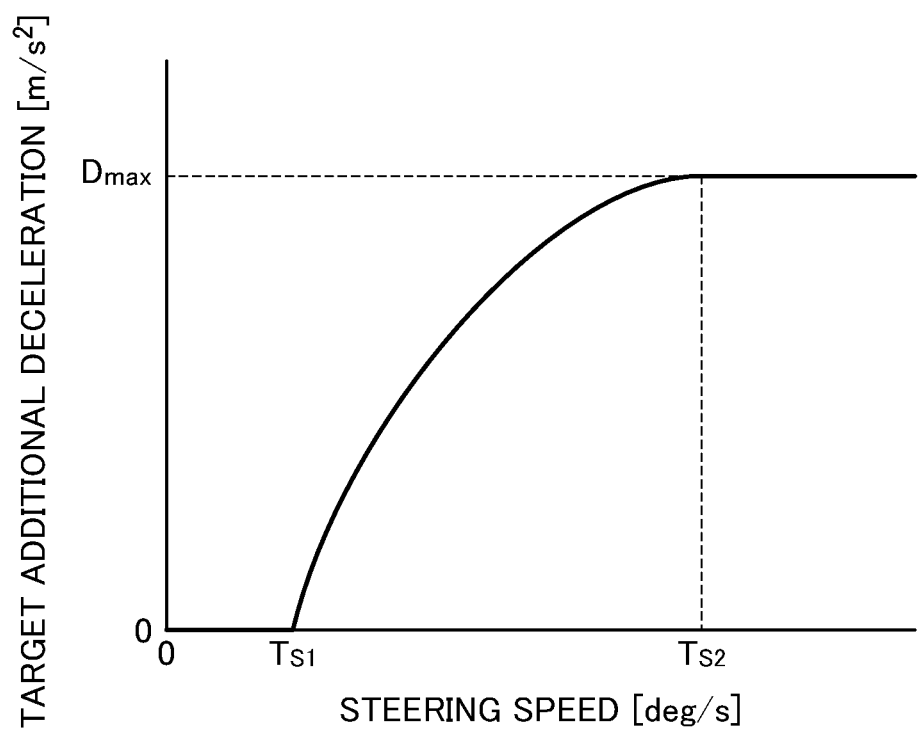
FIG. 5 is a map depicting a relationship between a steering speed, and a target additional deceleration to be decided by the vehicle behavior control device according to the embodiment of the present invention.

Specifically, the torque reduction amount-deciding part 18 operates to acquire a target additional deceleration which corresponds to the steering speed calculated in step S21, based on a relationship between the target additional deceleration and the steering speed, represented by the map in FIG. 5.

In FIG. 5, the horizontal axis represents the steering speed, and the vertical axis represents the target additional deceleration. As depicted in FIG. 5, when the steering speed is equal to or less than a threshold $T_S$, a corresponding target additional deceleration is 0. That is, when the steering speed is equal to or less than the threshold $T_{S1}$, the PCM 14 operates to stop control of adding a deceleration to the vehicle 1 (specifically, reduction of an output torque of the engine 4) based on the steering wheel operation.

On the other hand, when the steering speed is greater than the threshold $T_{S1}$, as the steering speed is increased to a higher value, a target additional deceleration which corresponds to the steering speed comes closer to a given upper limit value $D_{max}$. That is, as the steering speed is increased to a higher value, the target additional deceleration is increased, and a rate of increase of the target additional deceleration becomes smaller. This upper limit value $D_{max}$ is set to a deceleration (e.g., 0.5 m/s$^2$≅0.05 G) to the extent that a driver does not feel intervention of the control even when the deceleration is added to the vehicle 1 according to the steering wheel operation.

Further, when the steering speed is equal to or greater than a threshold $T_{S2}$ which is greater than the threshold $T_{S1}$, the target additional deceleration is maintained at the upper limit value $D_{max}$.

Subsequently, in step S25, the torque reduction amount-deciding part 18 operates to decide an additional deceleration in the current processing, under a condition that a change rate of the additional deceleration is equal to or less than a threshold Rmax (e.g., 0.5 m/s$^3$).

Specifically, the torque reduction amount-deciding part 18 operates to, when a change rate from the additional deceleration decided in the last processing to the target additional deceleration acquired in step S24 in the current processing is equal to or less than the threshold Rmax, decide the target additional deceleration acquired in step S24, as the additional deceleration in the current processing.

On the other hand, the torque reduction amount-deciding part 18 operates to, when the change rate from the additional deceleration decided in the last processing to the target additional deceleration acquired in step S24 in the current processing is greater than the threshold Rmax, decide, as the additional deceleration in the current processing, a value obtained by changing the additional deceleration decided in the last processing until the current processing at the change rate Rmax.

Subsequently, in step S26, the torque reduction amount-deciding part 18 operates to decide the torque reduction amount, based on the current additional deceleration decided in step S25. Specifically, the torque reduction amount-deciding part 18 operates to decide a torque reduction amount required for realizing the current additional deceleration, based on the current vehicle speed, gear stage, road gradient and others acquired in step S1.

On the other hand, in step S22, when the steering speed is not greater than the threshold $T_{S1}$, (i.e., when the steering speed is equal to or lower than the threshold $T_{S1}$), the processing advances to step S27. In step S27, the torque reduction amount-deciding part 18 operates to set the torque reduction flag, indicative of whether or not the condition for allowing reduction of the output torque of the engine 4 so as to add a deceleration to the vehicle 1 is satisfied, to False (false value) indicative of a state in which the condition for allowing the torque reduction is not satisfied.

After completion of step S26 or S27, the torque reduction amount-deciding part 18 operates to finish the torque reduction amount-deciding processing, and the processing returns to the main routine.

Returning to FIG. 3, after performing the processing in steps S2 and S3 and the torque reduction amount-deciding processing in step S4, in step S5, the final target torque-deciding part 20 operates to subtract the torque reduction amount decided in the torque reduction amount-deciding processing in step S4, from the basic target torque decided in step S3, to thereby decide the final target torque.

Subsequently, in step S6, the engine control part 22 operates to control the engine 4 to cause the engine 4 to output the final target torque set in step S5. Specifically, the engine control part 22 operates to, based on the final target torque set in step S5 and an engine speed, decide various state amounts (e.g., air charge amount, fuel injection amount, intake-air temperature, and oxygen concentration) required for realizing the final target torque, and then, based on the decided state amounts, control respective actuators for driving the respective constitutional elements of the engine 4. In this case, the engine control part 22 operates to set a limit value or a limit range corresponding to the state amount, and set a controlled variable of each actuator to enable its related state amount to preserve limitation by the limit value or the limit range, so as to execute control.

After completion of step S6, the PCM 14 operates to finish the engine control processing.

Next, with reference to FIG. 6, an example of an engine control by the vehicle behavior control device according to the embodiment of the present invention will be described. FIG. 6 is a time chart depicting a temporal change of parameters pertaining to the engine control during turning of the vehicle 1 equipped with the vehicle behavior control device according to the embodiment of the present invention.

The chart (a) of FIG. 6 is a plan view schematically depicting the vehicle 1 which is turning in a clockwise direction. As depicted in the chart (a) of FIG. 6, the vehicle 1 starts turning in the clockwise direction from a position A, and continues turning in the clockwise direction at a constant steering wheel angle from a position B to a position C.

The chart (b) of FIG. 6 is a diagram depicting a change in steering wheel angle of the vehicle 1 which is turning in the clockwise direction as depicted in the chart (a) of FIG. 6. In the chart (b) of FIG. 6, the horizontal axis represents the time, and the vertical axis represents the steering wheel angle.

As depicted in the chart (b) of FIG. 6, clockwise steering is started at the position A, and then, along with an additional turning operation of the steering wheel, a clockwise steering wheel angle gradually increases, and the clockwise steering wheel angle reaches maximum at the position B. Thereafter, the steering wheel angle is maintained constant until the position C (maintaining of steering wheel).

The chart (c) of FIG. 6 is a diagram depicting a change in steering speed of the vehicle 1 which is turning in the clockwise direction as depicted in the chart (a) of FIG. 6. In the chart (c) of FIG. 6, the horizontal axis represents the time, and the vertical axis represents the steering speed.

The steering speed of the vehicle 1 is expressed as a temporal differentiation of the steering wheel angle of the vehicle 1. That is, as depicted in the chart (c) of FIG. 6, when clockwise steering is started at the position A, a clockwise steering speed arises, and the steering speed is maintained approximately constant in an intermediate zone between the position A and the position B. Thereafter, the clockwise steering speed decreases and, when the clockwise steering wheel angle reaches maximum at the position B, the steering speed becomes 0. Further, in an intermediate zone between the position B and the position C where the clockwise steering wheel angle is maintained, the steering speed remains at 0.

The chart (d) of FIG. 6 is a diagram depicting a truth value of the torque reduction flag set based on the steering speed.

In the chart (d) of FIG. 6, the horizontal axis represents the time, and the vertical axis represents the truth value of the torque reduction flag.

As depicted in the chart (d) of FIG. 6, before clockwise steering is started at the position A, the torque reduction flag is set to False. After the clockwise steering is started at the position A, the torque reduction flag is changed from False to True when the steering speed exceeds the threshold $T_{S1}$. Thereafter, the steering speed decreases as the vehicle 1 approaches the position B and, when the steering speed becomes equal to or lower than the threshold $T_{S1}$, the torque reduction flag is changed from True to False.

The chart (e) of FIG. 6 is a diagram depicting a change in additional deceleration decided based on the steering speed and the torque reduction flag. In the chart (e) of FIG. 6, the horizontal axis represents the time, and the vertical axis represents the additional deceleration.

As described with reference to FIG. 4, the torque reduction amount-deciding part 18 operates, when the steering speed is greater than the threshold $T_{S1}$ (that is, when the torque reduction flag is True) in step S22, to acquire the target additional deceleration based on the steering speed in step S24. Subsequently, in step S25, the torque reduction amount-deciding part 18 operates to decide the additional deceleration in each processing cycle, under a condition that the increase rate of the additional deceleration is equal to or less than the threshold Rmax.

As depicted in the chart (e) of FIG. 6, the additional deceleration starts increasing from a point at which the torque reduction flag is switched from False to True, and is maintained approximately constant in an intermediate zone between the position A and the position B. Thereafter, the additional deceleration decreases in accordance with a decrease in steering speed, and becomes 0 when the torque reduction flag is switched from True to False.

The chart (f) of FIG. 6 is a diagram depicting a change in torque reduction amount decided based on the additional deceleration depicted in the chart (e) of FIG. 6. In the chart (f) of FIG. 6, the horizontal axis represents the time, and the vertical axis represents the torque reduction amount.

As mentioned above, the torque reduction amount-deciding part 18 operates to decide the torque reduction amount required for realizing an additional deceleration, based on parameters such as the current vehicle speed, gear stage and road grade. Thus, in the case where these parameters are constant, the torque reduction amount is decided so as to change in the same pattern as that of the additional deceleration depicted in the chart (e) of FIG. 6.

The chart (g) of FIG. 6 is a diagram depicting a change in final target torque decided based on the basic target torque and the torque reduction amount. In the chart (g) of FIG. 6, the horizontal axis represents the time, and the vertical axis represents the torque. Further, in the chart (g) of FIG. 6, the broken line indicates the basic target torque, and the solid line indicates the final target torque.

As described with reference to FIG. 3, the final target torque-deciding part 20 operates to subtract the torque reduction amount decided in the torque reduction amount-deciding processing in step S4, from the basic target torque decided in step S3, to thereby decide the final target torque.

That is, as depicted in the chart (g) of FIG. 6, during a period where the torque reduction flag is set to True in an intermediate zone between the position A and the position B, the final target torque is reduced from the basic target torque by an amount corresponding to the torque reduction amount, and deceleration which corresponds to this torque reduction is generated in the vehicle 1 and hence, a load shift to the front road wheels 2 occurs. As a result, a frictional force between the front road wheels 2 and a road surface increases so that a cornering force of the front road wheels 2 increases.

Figure 7A:
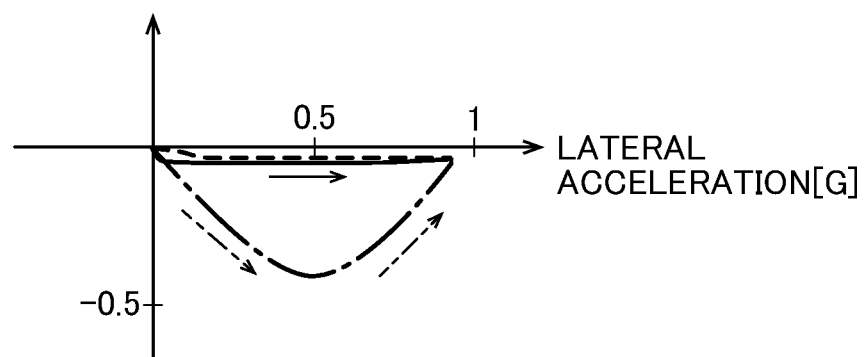
FIG. 7A is a diagram depicting a change in longitudinal acceleration and lateral acceleration during turning of the vehicle equipped with the vehicle behavior control device according to the embodiment of the present invention.
Figure 7B:
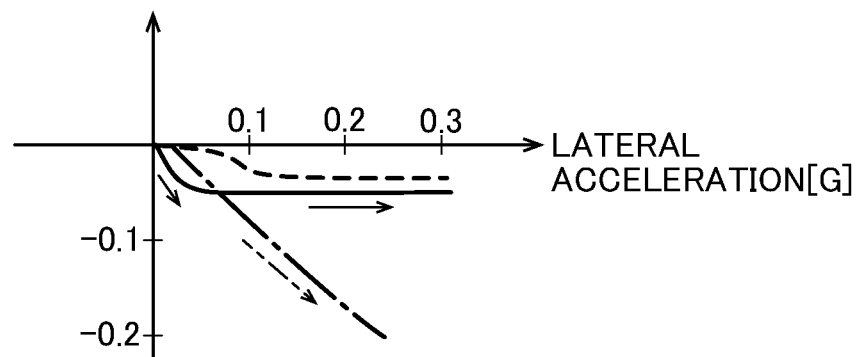
FIG. 7B is a diagram depicting the change in longitudinal acceleration and lateral acceleration during turning of the vehicle equipped with the vehicle behavior control device according to the embodiment of the present invention.

Subsequently, a change in longitudinal acceleration and lateral acceleration generated in a vehicle due to a control performed by the vehicle behavior control device according to the embodiment of the present invention will be described with reference to FIGS. 7A and 7B. FIG. 7A is a diagram depicting a change in longitudinal acceleration and lateral acceleration during a period from at a time when the vehicle equipped with the vehicle behavior control device according to the embodiment of the present invention starts to perform turning in the clockwise direction from straight traveling as depicted in chart (a) of FIG. 6 until the vehicle starts to perform regular circle turning, and FIG. 7B is a diagram depicting an extremely-small-acceleration region (that is, an initial stage of turning) in FIG. 7A in an enlarged manner. In FIGS. 7A and 7B, the horizontal axis represents the lateral acceleration (the acceleration to the right side in the vehicle width direction has a positive value), and the vertical axis represents the longitudinal acceleration (acceleration in a traveling direction has a positive value, and deceleration in the traveling direction has a negative value).

Further, in FIGS. 7A and 7B, the solid line indicates a change in longitudinal acceleration and lateral acceleration of the vehicle equipped with the vehicle behavior control device according to the embodiment of the present invention. The one-dot chain line indicates a change in longitudinal acceleration and lateral acceleration of the vehicle equipped with a conventional vehicle motion control device as described in Patent Literature 1. The broken line indicates a change in longitudinal acceleration and lateral acceleration when control is not performed by these control devices.

As indicated by the one-dot chain line in FIG. 7A, in the conventional vehicle motion control device as described in Patent Literature 1, only a steering operation for turning performed by a driver causes a deceleration to increase or decrease in accordance with an increase in lateral acceleration such that an acceleration obtained by synthesizing a lateral acceleration and a longitudinal acceleration traces an arc shape in a counterclockwise direction. That is, to realize a vehicle motion like a motion performed by an expert driver where a synthetic acceleration traces an arc shape in the counterclockwise direction at a constant rate, the control device causes a deceleration substantially equal to a lateral acceleration, which is generated in the vehicle in accordance with steering operation performed by the driver, to generate and, thereafter, causes the deceleration to decrease. To allow a driver to feel that the synthetic acceleration is varying at a constant rate, a magnitude of deceleration which is generated by the control may reach 0.5 G. A deceleration of 0.5 G is deceleration which is generated by a strong braking operation performed in case of emergency, and at which a passenger standing on a bus may fall, for example. Accordingly, a driver who does not perform a deceleration operation may experience a strong feeling of intervention of the control.

On the other hand, as indicated by the solid line in FIG. 7A, a deceleration to be generated by the control performed by the vehicle behavior control device according to the embodiment of the present invention is limited to approximately 0.001 G to 0.01 G, and to 0.05 G (upper limit value $D_{max}$ of the target additional deceleration) at maximum. A deceleration of 0.05 G is substantially equal to a deceleration which is indicated by the broken line in FIG. 7A, and is generated during turning when control by the control devices is not performed (that is, a deceleration caused by a drag force which is generated by a frictional force between a road surface and a road wheel). Accordingly, the driver does not notice that a control of adding a deceleration is being performed.

Particularly, as depicted in FIG. 7B in an enlarged manner, the PCM 14 in this embodiment starts to reduce an output torque of the engine 4 when the steering speed becomes equal to or greater than the threshold $T_{S1}$ at the initial stage of turning of the vehicle thus causing the torque reduction flag to be set to True, and the PCM 14 causes a deceleration to rapidly increase in a region where the lateral acceleration is extremely small. With such a configuration, a deceleration rises more promptly compared to the case where control of adding a deceleration is not performed. Accordingly, when a driver starts a steering wheel operation, a vertical load on the front road wheels can be immediately increased so as to increase a cornering force and hence, it is possible to improve responsivity of vehicle behavior and a linear feeling with respect to the steering wheel operation.

Subsequently, vehicle behavior when the vehicle equipped with the vehicle behavior control device according to the embodiment of the present invention is caused to perform turning traveling will be described with reference to FIG. 8 to FIG. 12.

To evaluate the manner of change in vehicle behavior when an output torque of the engine 4 is reduced in accordance with a lateral jerk which is generated with steering input at the initial stage of turning, inventors of the present invention caused the vehicle equipped with the vehicle behavior control device according to the above embodiment to travel a single corner where the vehicle transitions from straight traveling to regular circle turning at a constant vehicle speed. The inventors measured various parameters pertaining to vehicle behavior over this period.

Figure 8:
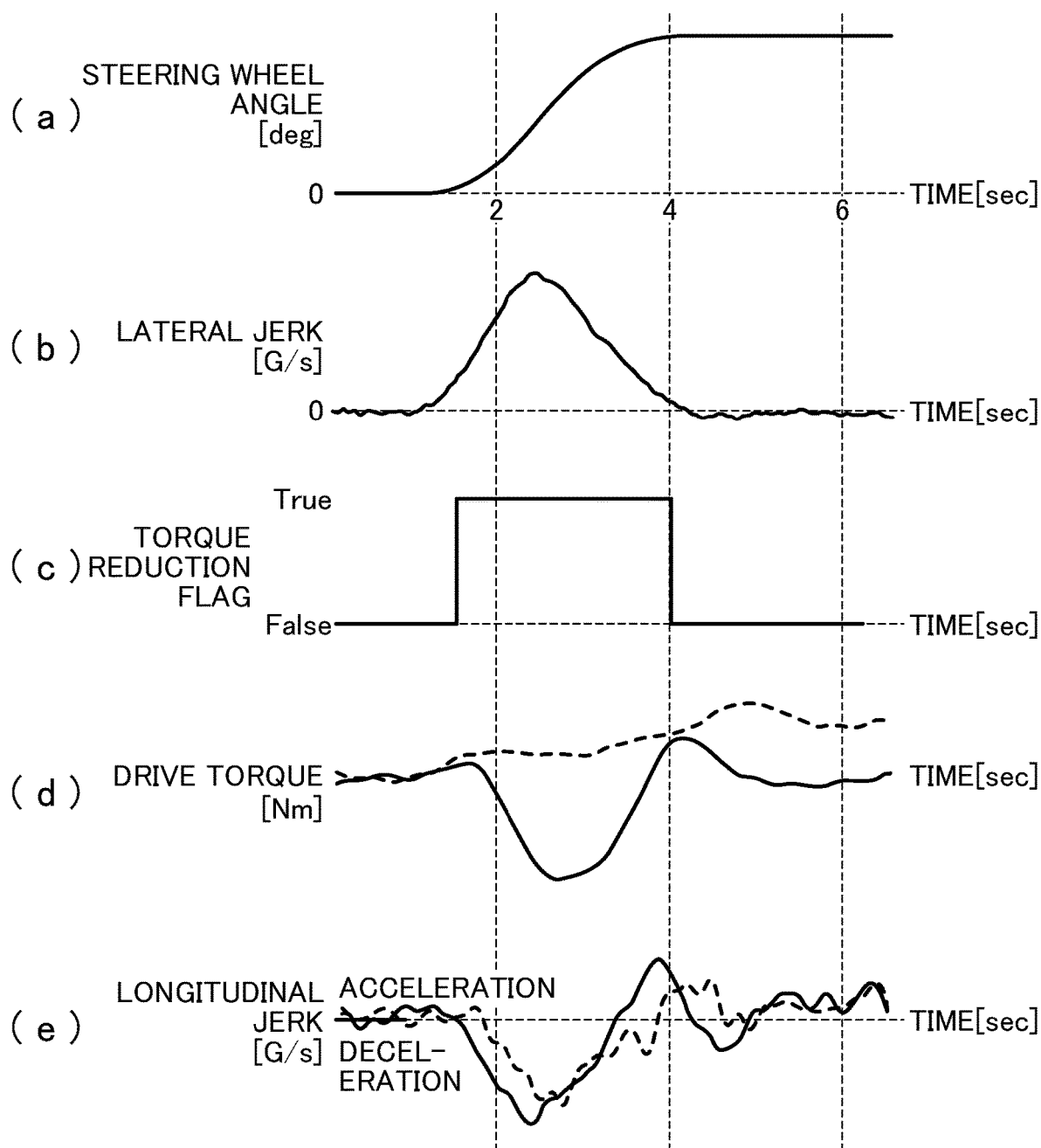
FIG. 8 is a diagram depicting measurement results of vehicle behavior when the vehicle equipped with the vehicle behavior control device according to the embodiment of the present invention is caused to perform turning traveling, wherein: the chart (a) is a diagram depicting a change in steering wheel angle of the vehicle; the chart (b) is a diagram depicting a change in lateral jerk which is generated in the vehicle; the chart (c) is a diagram depicting a value of the torque reduction flag set based on the steering speed; the chart (d) is a diagram depicting a change in drive torque which drives a front road wheel; and the chart (e) is a diagram depicting a change in longitudinal jerk which is generated in the vehicle.

FIG. 8 is a diagram depicting measurement results of vehicle behavior when the vehicle equipped with the vehicle behavior control device according to this embodiment is caused to perform turning traveling, wherein: the chart (a) of FIG. 8 is a diagram depicting a change in steering wheel angle of the vehicle; the chart (b) of FIG. 8 is a diagram depicting a change in lateral jerk which is generated in the vehicle; the chart (c) of FIG. 8 is a diagram depicting a value of the torque reduction flag set based on the steering speed; the chart (d) of FIG. 8 is a diagram depicting a change in drive torque which drives a front road wheel; and the chart (e) of FIG. 8 is a diagram depicting a change in longitudinal jerk which is generated on the vehicle. In the chart (d) of FIG. 8 and the chart (e) of FIG. 8, the solid line indicates the result of the vehicle equipped with the vehicle behavior control device of this embodiment, and the broken line indicates the result of the conventional vehicle which is not equipped with the vehicle behavior control device.

An increase in slip angle of the front road wheels along with an increase in steering wheel angle generates a cornering force due to a frictional force between a road surface and a ground contact surface of the front road wheels. Due to such generation of cornering force, a lateral jerk is generated substantially simultaneously with the start of an increase in steering wheel angle as depicted in charts (a) and (b) of FIG. 8. The lateral jerk changes substantially in the same pattern as the steering speed obtained by time-differentiating a steering wheel angle.

As depicted in the chart (c) of FIG. 8, the torque reduction flag is set to True during the period that a lateral jerk is generated, that is, during the period that the steering speed is generated, so that a drive torque is reduced as indicated by the solid line in the chart (d) of FIG. 8. As described above, it can be seen that the vehicle behavior control device is operated as described with reference to FIG. 6.

When a slip angle of the front road wheels 2 is increased, a drag force is also generated due to a frictional force between the road surface and the ground contact surface of the front road wheels. Due to a compliance element of a suspension or the like, a slight delay is present between the generation of the drag force and the generation of deceleration in the vehicle due to such a drag force. Accordingly, in the vehicle which is not equipped with the vehicle behavior control device of this embodiment, as indicated by the broken line in the chart (e) of FIG. 8, a rearward jerk (deceleration jerk) in the longitudinal direction of the vehicle is generated at a later time than a lateral jerk.

On the other hand, in the vehicle equipped with the vehicle behavior control device of this embodiment, drive torque reduction is started immediately after a steering speed becomes equal to or greater than the threshold $T_{S1}$ so that the torque reduction flag is set to True. Accordingly, as indicated by the solid line in the chart (e) of FIG. 8, at a timing earlier than a deceleration jerk caused only by a drag force, a deceleration jerk is generated substantially simultaneously with the generation of a lateral jerk thus allowing a peak of the deceleration jerk to appear at a time earlier than a peak of the lateral jerk. Accordingly, immediately after the lateral jerk is generated, a vertical load on the front road wheels is increased and hence, it is possible to control behavior of the vehicle with good responsivity with respect to a steering wheel operation performed by a driver.

Figure 9:
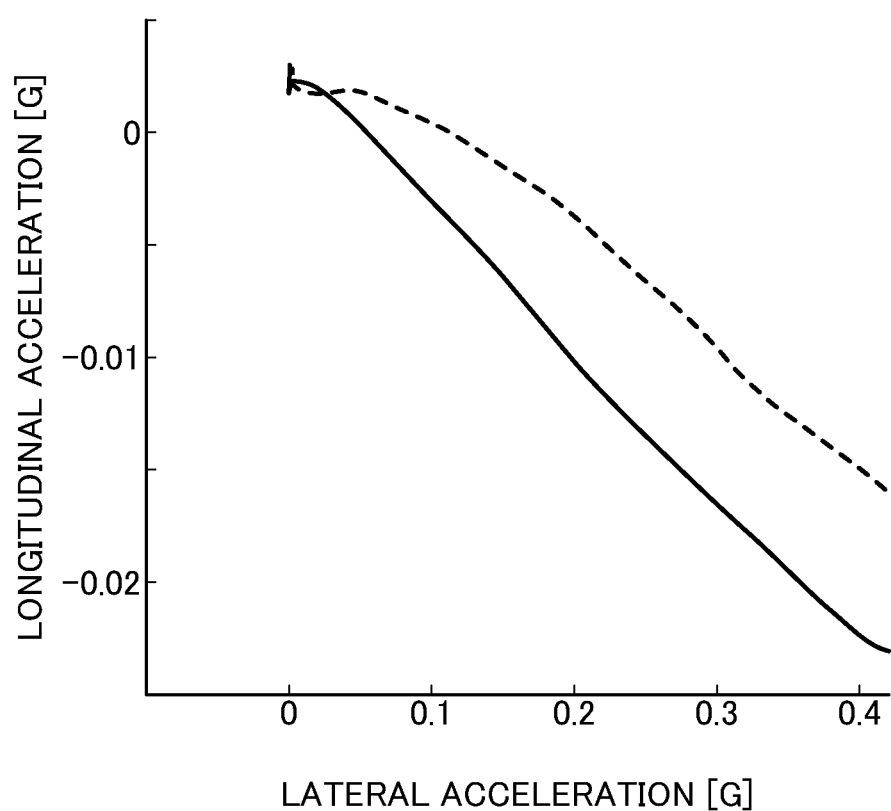
FIG. 9 is a diagram depicting the manner of generation of the lateral acceleration and the longitudinal acceleration when each of the vehicle equipped with the vehicle behavior control device according to the embodiment of the present invention and a vehicle which is not equipped with the vehicle behavior control device is caused to perform turning traveling.

FIG. 9 is a diagram depicting the manner of generation of the lateral acceleration and the longitudinal acceleration during the above-mentioned turning traveling. In FIG. 9, the horizontal axis represents the acceleration in a vehicle width direction (lateral acceleration), and the vertical axis represents the acceleration in a longitudinal direction (longitudinal acceleration). Further, in FIG. 9, acceleration in a deceleration direction (deceleration) is expressed as a negative value.

As mentioned above, in the vehicle which is not equipped with the vehicle behavior control device of this embodiment, when a steering wheel angle starts to increase, a deceleration jerk is generated at a later time than a lateral jerk. Accordingly, as indicated by the broken line in FIG. 9, a deceleration does not increase on the rise of a lateral acceleration (0 to 0.1 G) and, when the lateral acceleration increases (that is, when a cornering force increases), the deceleration increases in accordance with an increase in drag force.

On the other hand, in the vehicle equipped with the vehicle behavior control device of this embodiment, a reduction of driving force of the vehicle is started when the steering speed becomes equal to or greater than the threshold $T_{S1}$. Accordingly, at a timing earlier than a deceleration jerk caused only by a drag force, a deceleration jerk is generated substantially simultaneously with the generation of a lateral jerk thus allowing the peak of the deceleration jerk to appear at a time earlier than the peak of the lateral jerk. Therefore, as indicated by the solid line in FIG. 9, a deceleration also rises following the rise of a lateral acceleration (0 to 0.1 G) so that the lateral acceleration and the deceleration vary while maintaining a linear relationship. Accordingly, it is possible to not only control behavior of the vehicle with good responsivity with respect to a steering wheel operation performed by a driver but also control behavior of the vehicle in such a manner as to also improve stability of the vehicle attitude and riding comfort.

FIG. 10 is a diagram depicting the manner of occurrence of rolling and pitching during the above-mentioned turning traveling. In FIG. 10, the horizontal axis represents a roll angle, and the vertical axis represents a pitch angle. Further, in FIG. 10, a pitch angle in a direction that a front portion of the vehicle dips is expressed as a negative value.

As mentioned above, in the vehicle which is not equipped with the vehicle behavior control device of this embodiment, when a steering wheel angle starts to increase, a deceleration jerk is generated at a later time than a lateral jerk so that a deceleration does not increase on the rise of a lateral acceleration. Accordingly, as indicated by the broken line in FIG. 10, a load shift occurs in the vehicle width direction of the vehicle in accordance with an increase in lateral acceleration thus increasing a roll angle. However, a pitch angle increases or decreases irrespective of an increase in roll angle.

On the other hand, in the vehicle equipped with the vehicle behavior control device of this embodiment, a reduction of driving force of the vehicle is started when the steering speed becomes equal to or greater than the threshold $T_{S1}$. Accordingly, a deceleration jerk is generated substantially simultaneously with the generation of a lateral jerk so that a deceleration is also caused to rise following the rise of a lateral acceleration. Therefore, a pitch angle is increased in the direction that the front portion of the vehicle dips in synchronization with an increase in roll angle.

Figure 11A:
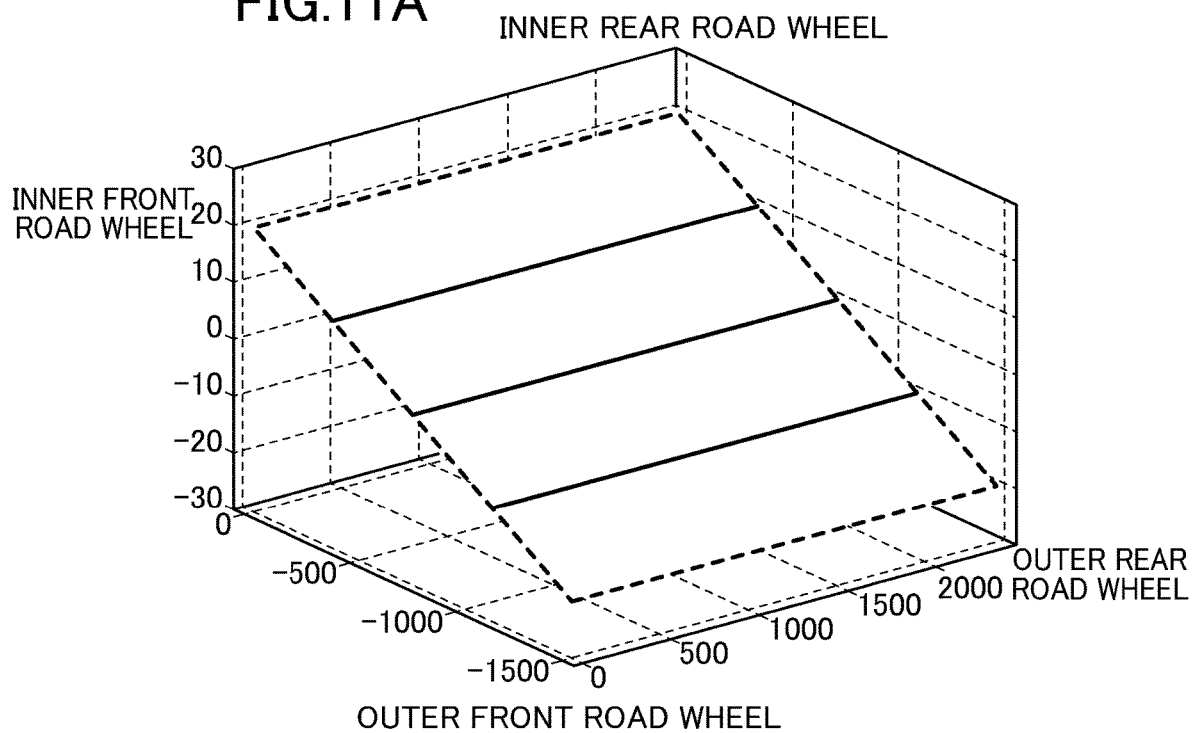
FIG. 11A is a schematic view depicting the vehicle attitude in terms of an amount of expansion or contraction of a suspension of each road wheel, and is also a view depicting the vehicle attitude when parallel rolling occurs.
Figure 11B:
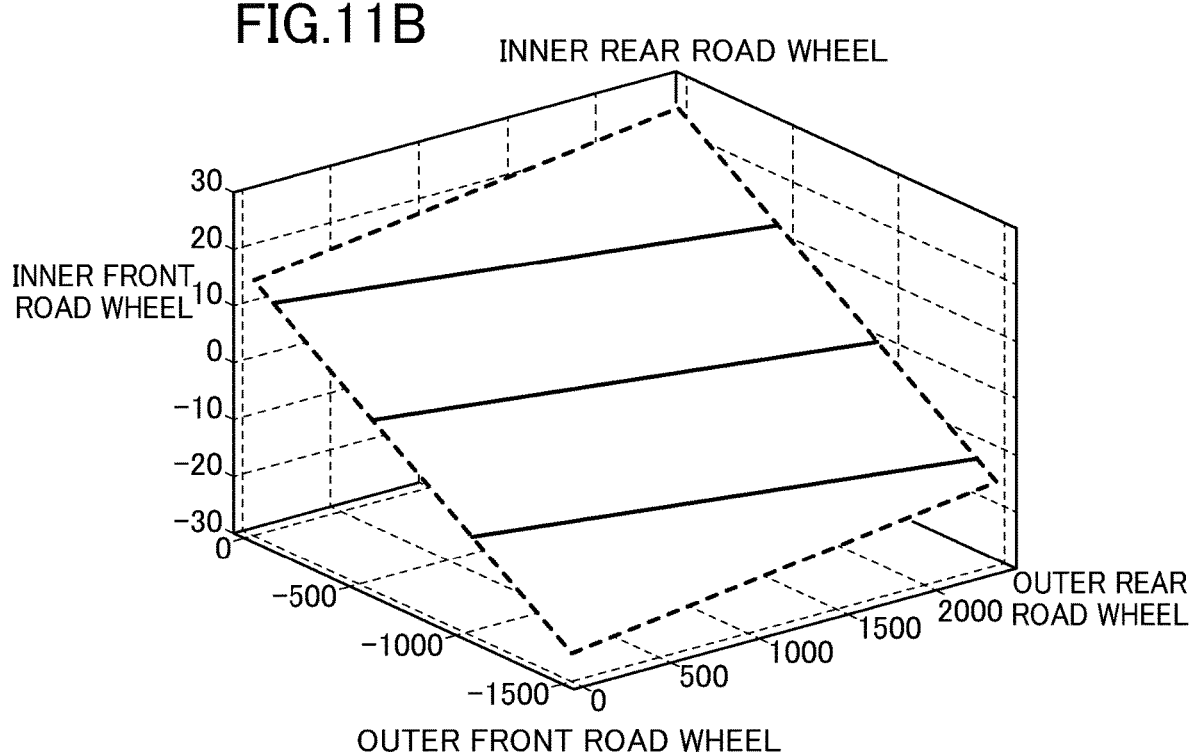
FIG. 11B is a schematic view depicting the vehicle attitude in terms of the amount of expansion or contraction of the suspension of each road wheel, and is also a view depicting the vehicle attitude when diagonal roll occurs.

FIGS. 11A and 11B are schematic views depicting the vehicle attitude in terms of an amount of expansion or contraction of a suspension of each road wheel, wherein: FIG. 11A is a view depicting the vehicle attitude when parallel rolling occurs, and FIG. 11B is a view depicting the vehicle attitude when diagonal roll occurs.

As mentioned above, in the vehicle which is not equipped with the vehicle behavior control device of this embodiment, a load shift occurs in the vehicle width direction of the vehicle in accordance with an increase in lateral acceleration thus increasing a roll angle. However, a pitch angle increases or decreases irrespective of an increase in roll angle. Accordingly, at the initial stage of turning, only a roll angle increases so that the parallel roll attitude as depicted in FIG. 11A is assumed and, thereafter, the forward inclined attitude or the rearward inclined attitude is assumed due to pitching which occurs irrespective of a roll angle.

On the other hand, in the vehicle equipped with the vehicle behavior control device of this embodiment, a reduction of driving force of the vehicle is started when the steering speed becomes equal to or greater than the threshold $T_{S1}$ so that a pitch angle is increased in a direction that the front portion of the vehicle dips in synchronization with an increase in roll angle. Accordingly, at the initial stage of turning, rolling and pitching in which the front portion of the vehicle dips occur in synchronization with each other and hence, the diagonal roll attitude as depicted in FIG. 11B is assumed.

As described above, in the vehicle behavior control device according to the present invention, a driving force reduction amount is promptly increased in a region at the initial stage of turning where the lateral acceleration is extremely small so that a situation in which the vehicle attitude may smoothly shift to a diagonal roll attitude is created when a driver starts a steering wheel operation. Such a configuration causes the cornering force of the front road wheels to increase thus improving responsivity of turning behavior and, at the same time, allows a driver to precisely recognize the generation and continuation of the turning behavior from that point.

Figure 12A:
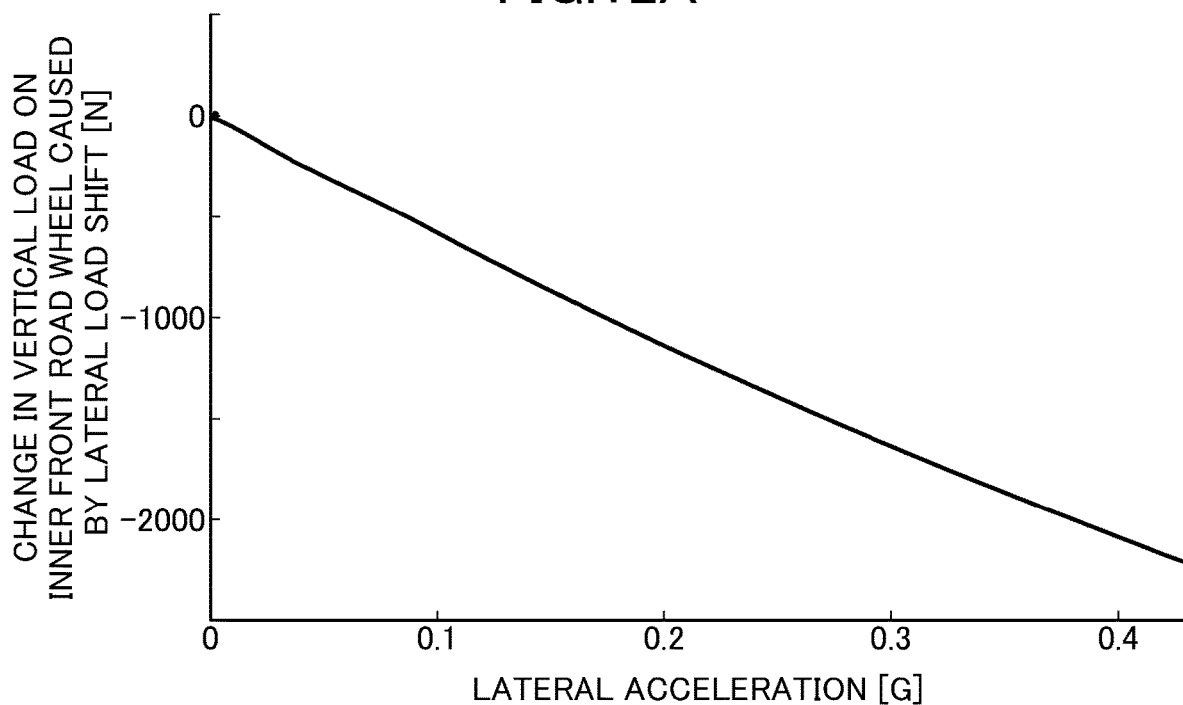
FIG. 12A is a diagram depicting the manner of change in vertical load on the front road wheel when each of the vehicle equipped with the vehicle behavior control device according to the embodiment of the present invention and the vehicle which is not equipped with the vehicle behavior control device is caused to perform turning traveling, and is also a diagram depicting a change in vertical load on an inner front road wheel which is caused by a lateral load shift.
Figure 12B:
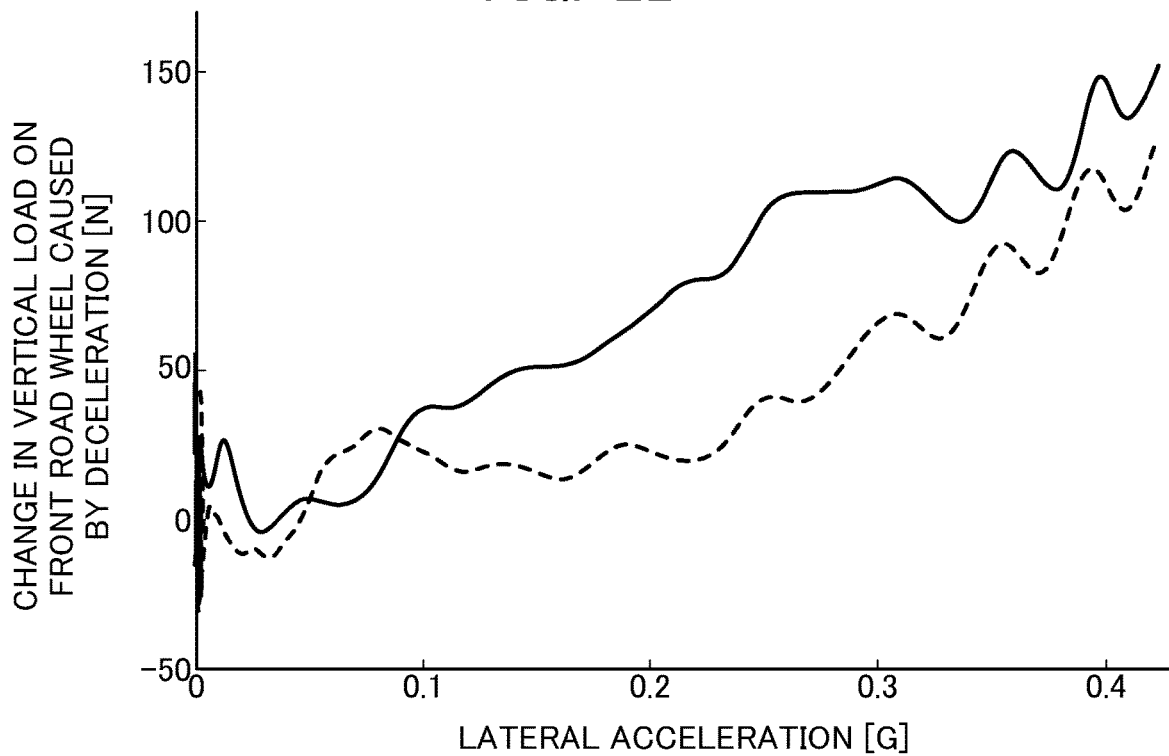
FIG. 12B is a diagram depicting the manner of change in vertical load on the front road wheel when each of the vehicle equipped with the vehicle behavior control device according to the embodiment of the present invention and the vehicle which is not equipped with the vehicle behavior control device is caused to perform turning traveling, and is also a diagram depicting a change in vertical load on the front road wheels which is caused by a deceleration of the vehicle.

FIGS. 12A and 12B are diagrams depicting the manner of change in vertical load on the front road wheels during the above-mentioned turning traveling, wherein: FIG. 12A is a diagram depicting a change in vertical load on the inner front road wheel which is caused by a lateral load shift; and FIG. 12B is a diagram depicting a change in vertical load on the front road wheels which is caused by a deceleration of the vehicle.

As mentioned above, in the vehicle which is not equipped with the vehicle behavior control device of this embodiment, when steering wheel angle starts to increase, a deceleration does not increase on the rise of a lateral acceleration and hence, as indicated by the broken line in FIGS. 12A and 12B, an amount of lateral load shift of the front road wheels linearly increases in accordance with an increase in lateral acceleration. However, at the rise (0 to 0.1 G) of the lateral acceleration, a longitudinal load shift is not generated by the deceleration and hence, a change in vertical load on the front road wheels does not occur due to the deceleration. Therefore, when lateral acceleration increases, deceleration increases in accordance with an increase in drag force, thus increasing an amount of change in vertical load on the front road wheels which is caused by the deceleration.

On the other hand, in the vehicle equipped with the vehicle behavior control device of this embodiment, a reduction of driving force of the vehicle is started when the steering speed becomes equal to or greater than the threshold $T_{S1}$. Accordingly, deceleration also rises following the rise of the lateral acceleration so that the lateral acceleration and the deceleration vary while maintaining a linear relationship. Therefore, as indicated by the solid line in FIGS. 12A and 12B, in synchronization with a linear increase in amount of lateral load shift of the front road wheels in accordance with an increase in lateral acceleration, a longitudinal load shift is generated by deceleration thus increasing an amount of change in vertical load on the front road wheels from the rise (0 to 0.1 G) of the lateral acceleration. With such a configuration, at the initial stage of turning of the vehicle, a vertical load on the front road wheels is increased so as to suppress a decrease in vertical load on the inner front road wheel which is caused by lateral load shift thus increasing a cornering force of the front road wheels and hence, responsivity of turning behavior can be improved.

Subsequently, another modification of the embodiment of the present invention will be described.

The above embodiment has been described based on an example where a torque reduction amount-deciding part 18 operates to acquire the target additional deceleration based on the steering speed, and decide the torque reduction amount based on the target additional deceleration. However, the torque reduction amount-deciding part 18 may operate to decide the torque reduction amount based on any driving state of the vehicle 1 other than the accelerator pedal operation (e.g., steering wheel angle, lateral acceleration, yaw rate, slip ratio or the like).

For example, the torque reduction amount-deciding part 18 may operate to acquire a target additional deceleration based on a lateral acceleration input from an acceleration sensor or a lateral jerk obtained by time-differentiating a lateral acceleration, and decide a torque reduction amount.

The above embodiment has been described based on an example where the PCM 14 reduces an output torque of the engine 4 in accordance with the target additional deceleration thus generating a rearward deceleration jerk in the longitudinal direction in the vehicle 1 so that a pitch angle is increased in a direction that the front portion of the vehicle dips and, at the same time, a vertical load on the front road wheels is increased. However, the configuration may be adopted where a deceleration jerk is generated by an active engine mount which supports the engine 4 in a vertically movable manner or by an active suspension which can control operation and characteristics of the suspension, and a pitch angle is increased in a direction that the front portion of the vehicle dips and, at the same time, a vertical load on the front road wheels is increased.

The above embodiment has been described based on an example where the vehicle 1 equipped with the vehicle behavior control device mounts the engine 4 for driving drive road wheels. However, the vehicle behavior control device of the present invention is also applicable to a vehicle which mounts a motor for driving drive road wheels by electricity supplied from a battery or capacitor. In this case, a PCM 14 is configured to perform control of reducing a torque of the motor according to a steering speed of the vehicle 1.

Subsequently, advantageous effects of the vehicle behavior control devices of the above embodiment of the present invention and the modification of the embodiment of the present invention will be described.

First of all, the PCM 14 starts to reduce an output torque of the engine 4 based on a lateral jerk-related quantity when the torque reduction flag is set to True, indicative of a state in which the condition for allowing reduction of an output torque of the engine 4 is satisfied. Accordingly, immediately after a lateral jerk is generated in the vehicle 1, the output torque of the engine 4 is reduced so as to increase a vertical load on the front road wheels and hence, it is possible to control behavior of the vehicle 1 with good responsivity with respect to a steering wheel operation performed by driver. Therefore, it is possible to improve responsivity of vehicle behavior and a linear feeling with respect to the steering wheel operation without causing the driver to experience a strong feeling of intervention of the control. Further, behavior which is intended by the driver is accurately realized and hence, extremely small correction steering becomes unnecessary thus also improving stability of the vehicle attitude and riding comfort.

Further, the PCM 14 sets, when a lateral jerk-related quantity exceeds a given threshold, the torque reduction flag to True. Accordingly, when the lateral jerk-related quantity is equal to or lower than the threshold, it is possible to suppress the excessive reaction of the vehicle 1 with respect to an extremely small steering wheel operation. Therefore, it is possible to control behavior of a vehicle in such a manner as to accurately realize a behavior which is intended by the driver without causing the driver to feel discomfort with respect to vehicle behavior during straight traveling.

The lateral jerk-related quantity is a steering speed of the vehicle 1 and hence, a driving force can be immediately reduced in response to the start of a steering wheel operation performed by a driver. Therefore, it is possible to control behavior of the vehicle 1 with better responsivity with respect to the steering wheel operation performed by the driver.

The PCM 14 generates, when the steering speed becomes equal to or greater than the threshold $T_{S1}$, a rearward deceleration jerk in the longitudinal direction of the vehicle 1 is generated and hence, after the driver starts the steering wheel operation, at a timing earlier than a deceleration jerk caused only by a drag force, a deceleration jerk can be generated substantially simultaneously with the generation of a lateral jerk. With such a configuration, at the initial stage of turning of the vehicle 1, the deceleration jerk is immediately generated according to the steering wheel operation so as to increase a deceleration thus increasing a vertical load on the front road wheels 2. Accordingly, it is possible to control behavior of the vehicle 1 with good responsivity and a linear feeling with respect to the steering wheel operation performed by the driver and, at the same time, to control behavior of the vehicle 1 such that the deceleration also rises following the rise of a lateral acceleration at the initial stage of turning so that the lateral acceleration and the deceleration vary while maintaining a linear relationship. Therefore, behavior of the vehicle 1 can be controlled in such a manner as to also improve stability of the vehicle attitude and riding comfort.

The PCM 14 starts, when the steering speed becomes equal to or greater than the threshold $T_{S1}$, to reduce an output torque of the engine 4 thus generating the deceleration jerk and hence, after the driver starts the steering wheel operation, the deceleration jerk can be generated with high responsivity. Accordingly, it is possible to control behavior of the vehicle 1 with better responsivity with respect to the steering wheel operation performed by the driver and, at the same time, to control behavior of the vehicle 1 in such a manner as to also further improve stability of the vehicle attitude and riding comfort.

The PCM 14 generates, when the steering speed becomes equal to or greater than the threshold $T_{S1}$, a deceleration jerk such that the peak of the deceleration jerk appears at a time earlier than the peak of a lateral jerk and hence, at the initial stage of turning of the vehicle 1, the deceleration jerk is immediately generated according to the steering wheel operation so as to increase a deceleration thus increasing a vertical load on the front road wheels 2. Accordingly, it is possible to control behavior of the vehicle 1 with better responsivity with respect to the steering wheel operation performed by a driver and, at the same time, to control behavior of the vehicle 1 in such a manner as to also improve stability of the vehicle attitude and riding comfort.

The PCM 14 increases, when the steering speed becomes equal to or greater than the threshold $T_{S1}$, a pitch angle in a direction that the front portion of the vehicle 1 dips and hence, after the driver starts the steering wheel operation, pitching in which the front portion of the vehicle 1 dips can be caused to occur when rolling occurs. With such a configuration, at the initial stage of turning of the vehicle 1, the diagonal roll attitude is assumed so that a cornering force of the front road wheels 2 is increased thus improving responsivity of turning behavior and, at the same time, allowing a driver to precisely recognize the generation and continuation of the turning behavior from that point. Accordingly, it is possible to control behavior of the vehicle 1 with good responsivity and a linear feeling with respect to the steering wheel operation performed by the driver and, at the same time, to control behavior of the vehicle 1 in such a manner as to also improve stability of the vehicle attitude and riding comfort.

The PCM 14 starts, when the steering speed becomes equal to or greater than the threshold $T_{S1}$, to reduce an output torque of the engine 4 thus increasing a pitch angle in a direction that the front portion of the vehicle 1 dips. Accordingly, after the driver starts the steering wheel operation, a deceleration is generated in the vehicle 1 by reducing a driving force, so that a pitch angle can be increased with high responsivity. Therefore, it is possible to control behavior of the vehicle 1 with better responsivity with respect to the steering wheel operation performed by the driver and, at the same time, to control behavior of the vehicle 1 in such a manner as to also further improve stability of the vehicle attitude and riding comfort.

The PCM 14 increases, when the steering speed becomes equal to or greater than the threshold $T_{S1}$, a pitch angle in a direction that the front portion of the vehicle 1 dips in synchronization with an increase in roll angle of the vehicle 1 and hence, the diagonal roll attitude can be reliably assumed at the initial stage of turning of the vehicle 1. Accordingly, it is possible to control behavior of the vehicle 1 with good responsivity with respect to the steering wheel operation performed by the driver and, at the same time, to control behavior of the vehicle 1 in such a manner as to also improve stability of the vehicle attitude and riding comfort.

The PCM 14 increases, when the steering speed becomes equal to or greater than the threshold $T_{S1}$, a vertical load on the front road wheels 2 and hence, after the driver starts the steering wheel operation, the vertical load on the front road wheels 2 can be increased when an amount of lateral load shift of the front road wheels 2 is increased in accordance with an increase in lateral acceleration. With such a configuration, at the initial stage of turning of the vehicle 1, the vertical load on the front road wheels 2 is increased so as to suppress a decrease in vertical load on the inner front road wheel which is caused by a lateral load shift so that a cornering force of the front road wheels 2 is increased thus improving responsivity of turning behavior. Therefore, it is possible to improve responsivity of vehicle behavior and a linear feeling with respect to the steering wheel operation without causing the driver to experience a strong feeling of intervention of the control. Further, behavior which is intended by the driver is accurately realized and hence, extremely small correction steering becomes unnecessary thus also improving stability of the vehicle attitude and riding comfort.

The PCM 14 starts, when the steering speed becomes equal to or greater than the threshold $T_{S1}$, to reduce a driving force of the vehicle 1 thus increasing a vertical load on the front road wheels 2. Accordingly, after the driver starts the steering wheel operation, a deceleration is generated in the vehicle 1 by reducing a driving force, so that a vertical load on the front road wheels 2 can be increased with high responsivity. With such a configuration, at the initial stage of turning, the vertical load on the front road wheels 2 is promptly increased so as to suppress a decrease in vertical load on the inner front road wheel which is caused by lateral load shift so that a cornering force of the front road wheels is increased thus improving responsivity of turning behavior.

The PCM 14 causes, when the steering speed becomes equal to or greater than the threshold $T_{S1}$, a vertical load on the front road wheels 2 to increase in synchronization with a lateral load shift of the front road wheels 2. Accordingly, at the initial stage of turning of the vehicle 1, a vertical load on the front road wheels 2 can be increased such that a decrease in vertical load on the inner front road wheel which is caused by lateral load shift is reliably suppressed. With such a configuration, a cornering force of the front road wheels 2 can be reliably increased and hence, responsivity of turning behavior can be improved.

LIST OF REFERENCE SIGNS

1 vehicle
2 front road wheel
4 engine
6 steering wheel
8 steering wheel angle sensor
10 accelerator position sensor
12 vehicle speed sensor
14 PCM
16 basic target torque-deciding part
18 torque reduction amount-deciding part
20 final target torque-deciding part
22 engine control part

The invention claimed is:

1. A vehicle behavior control device applied to a vehicle having a steerable front road wheel, the vehicle behavior control device comprising:
    a steering speed acquiring part configured to acquire a steering speed of the vehicle; and
    a deceleration jerk generating part configured to generate a deceleration jerk which is a rearward jerk in a longitudinal direction of the vehicle, when the steering speed becomes equal to or greater than a given threshold which is greater than zero,
    wherein, when the steering speed becomes equal to or greater than the threshold, the deceleration jerk generating part is configured to generate the deceleration jerk such that a peak of the deceleration jerk occurs before a peak of a jerk in a width direction of the vehicle.

2. The vehicle behavior control device according to claim 1, wherein the deceleration jerk generating part is configured to start to reduce a driving force of the vehicle when the steering speed becomes equal to or greater than the threshold, so as to generate the deceleration jerk.

* * * * *